US010713192B2

(12) United States Patent
Paganini et al.

(10) Patent No.: US 10,713,192 B2
(45) Date of Patent: Jul. 14, 2020

(54) DATA TRANSMISSION SYSTEM AND DATA TRANSMISSION METHOD

(71) Applicant: Kinetic Technologies, San Jose, CA (US)

(72) Inventors: Maurizio Paganini, San Jose, CA (US); Alan Kobayashi, Los Altos, CA (US); Ramakrishna Chilukuri, San Jose, CA (US); Rahul Kumar Agarwal, Saratoga, CA (US); Nobuhiro Yanagisawa, Milpitas, CA (US); Sujan Valiyaka Thomas, Pleasanton, CA (US)

(73) Assignee: Kinetic Technologies, San Jose, CA (US)

( * ) Notice: Subject to any disclaimer, the term of this patent is extended or adjusted under 35 U.S.C. 154(b) by 0 days.

(21) Appl. No.: 16/119,988

(22) Filed: Aug. 31, 2018

(65) Prior Publication Data

US 2019/0108148 A1 Apr. 11, 2019

Related U.S. Application Data

(60) Provisional application No. 62/570,879, filed on Oct. 11, 2017.

(51) Int. Cl.
*G06F 13/20* (2006.01)
*G06F 13/42* (2006.01)
*H04L 25/02* (2006.01)
*H04Q 11/08* (2006.01)

(52) U.S. Cl.
CPC .......... *G06F 13/20* (2013.01); *G06F 13/4282* (2013.01); *H04L 25/0272* (2013.01); *H04Q 11/08* (2013.01); *G06F 2213/0042* (2013.01)

(58) Field of Classification Search
CPC ................. G06F 13/20; G06F 13/4282; G06F 2213/0042; H04L 25/0272; H04Q 11/08
See application file for complete search history.

(56) References Cited

U.S. PATENT DOCUMENTS 10,169,286 B2 * 1/2019 Hundal ............... G06F 13/4282

OTHER PUBLICATIONS

"Universal Serial Bus 3.1 Specification," Hewlett-Packard Company, Revision 1.0, Jul. 26, 2013.
Jim Choate, "VESA DisplayPort Alternate Mode on USB-C Technical Overview," USB Implementers Forum, Nov. 17-18, 2015.
"Expansion of Direct Connect Alt Mode Remappable Signals to Include A6 and A7," Applied to USB Type-C Cable and Connector Specification Revision 1.3, USB Implementers Forum, Jul. 14, 2017.
"Universal Serial Bus 3.2 Specification," Apple Inc., Revision 1.0, Sep. 22, 2017.

* cited by examiner

*Primary Examiner* — Idriss N Alrobaye
*Assistant Examiner* — Richard B Franklin
(74) *Attorney, Agent, or Firm* — Sheppard Mullin Richter & Hampton LLP (57) ABSTRACT

A data transmission system includes a transmitter having a first switching re-timer and a receiver having a second switching re-timer. The first switching re-timer is configured to double a link rate per lane and halve the number of lanes, and the second switching re-timer is configured to halve the doubled link rate and double the halved number of lanes.

25 Claims, 7 Drawing Sheets

Figure 1: DP Alt Mode on USB Type-C with Switches or Switching Re-timers

Figure 2: DP Alt Mode on USB Type-C with DP Link Rate Doubling/Having-Capable Switching Re-timers Figure 3: Internal Paths of DP Re-timers with Link Rate Doubling/Halving Capabilities Figure 4: Lane Multiplexing and De-multiplexing Alignment Figure 5: DP Alt Mode Discovery and Configuration through USB PD Controllers Figure 6: DP 2-lane Main Link Re-timing without Link Rate Doubling/Halving

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B12 | B11 | B10 | B9 | B8 | B7 | B6 | B5 | B4 | B3 | B2 | B1 |

Figure 7: USB Type-C Connector Receptacle Interface (PRIOR ART)

DATA TRANSMISSION SYSTEM AND DATA TRANSMISSION METHOD

CROSS-REFERENCE TO RELATED APPLICATIONS

This application claims the benefit of U.S. Patent Provisional Application No. 62/570,879, filed Oct. 11, 2017, which is herein incorporated by reference in its entirety.

TECHNICAL FIELD

The present disclosure relates to a data transmission method that has DisplayPort (DP) and Universal Serial Bus Universal Serial Bus (USB) on USB Type-C connector.

BACKGROUND

Figure 7:
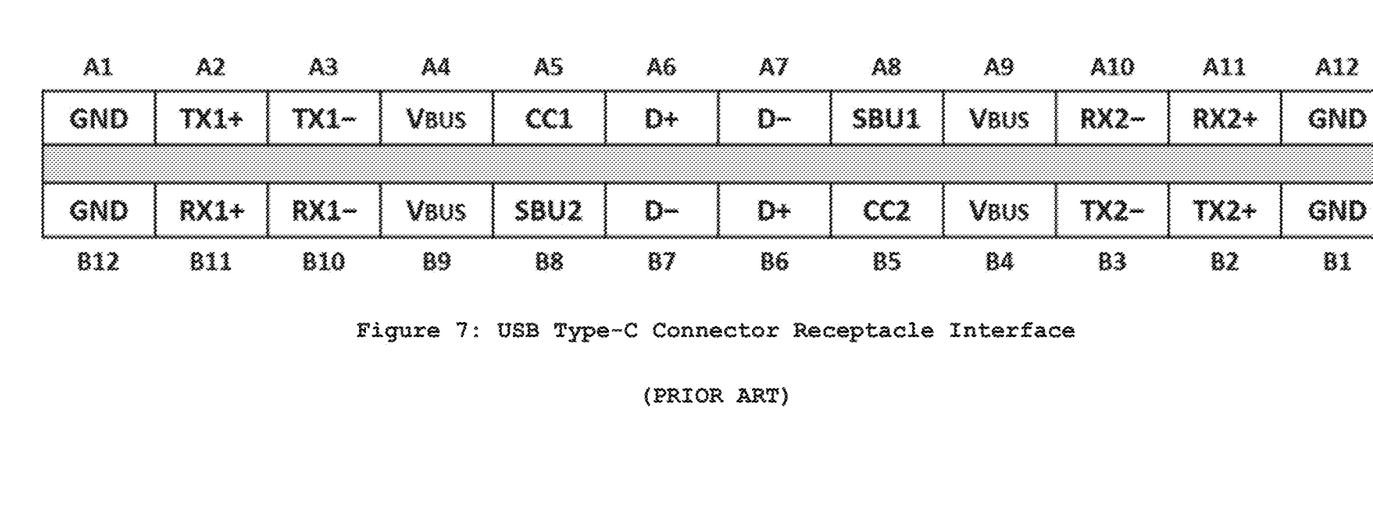
FIG. 7 illustrates the USB Type-C Connector Receptacle Interface

DP Alt Mode on USB Type-C enables concurrent transport of USB traffic (both USB3.x SS and USB2) and DP traffic over a standard USB Type-C connector. The USB Type-C connector supports 4 pairs of high-speed differential signaling with a bit rate up to 10 Gbps/pair and 2 pairs of pins for a USB2 differential signal (up to 480 Mbps), as depicted in FIG. 7. Only one of the 2 pairs, named A6/A7 and B6/B7 in FIG. 7, of USB2 pins is used for USB2 transport. The pair that is selected depends on the USB Type-C plug connector orientation.

DP Alt Mode on USB Type-C specification enables either (1) 2 lanes of DP Main Link concurrent with USB3.x SS and USB2 or (2) 4 lanes of DP Main Link concurrent with USB2 without USB3.x SS.

SUMMARY

Problems to be Solved

For applications such as AR (augmented reality) and VR (virtual reality), there is a growing desire to have the maximum-bandwidth DP transport of 4-lane Main Link at the highest DP link rate of 8.1 Gbps/lane (called HBR3 link rate) concurrent with USB3.1 SS transport. There is one approach that enables this concurrency by routing USB3.1 SS traffic to 2 pairs of USB2 pins on a USB Type-C connector while routing all 4 lanes of DP Main Link to the 4 pairs of high-speed differential signal pins. This approach, however, has the drawbacks as below:
  (1) Requires more complex signal multiplexing/routing
  (2) Requires tunneling of USB2 traffic through USB3.1 SS traffic
  (3) Requires a captive cable with USB Type-C plug connector only on one end

Brief Summary

The present disclosure describes technology enabling the concurrent transport of USB traffic and DP 4 Lane equivalent traffic over USB Type-C connector without drawbacks such as requirements of more complex signal multiplexing/routing.

According to one aspect of the present disclosure, a data transmission system includes a transmitter having a first switching re-timer and a receiver having a second switching re-timer. The first switching re-timer is configured to double a link rate per lane and halve the number of lanes, and the second switching re-timer is configured to halve the doubled link rate and double the halved number of lanes.

According to another aspect of the disclosure, a data transmission system includes a transmitter having a first switching re-timer and a receiver having a second switching re-timer. The first switching re-timer is configured to multiply a link rate per lane by M where M denotes an integer of 2 or more, and multiply the number of lanes by 1/M, and the second switching re-timer is configured to multiply the M-multiplied link rate by 1/M and multiply the 1/M-multiplied number of lanes by M.

DETAILED DESCRIPTION

Figure 1:
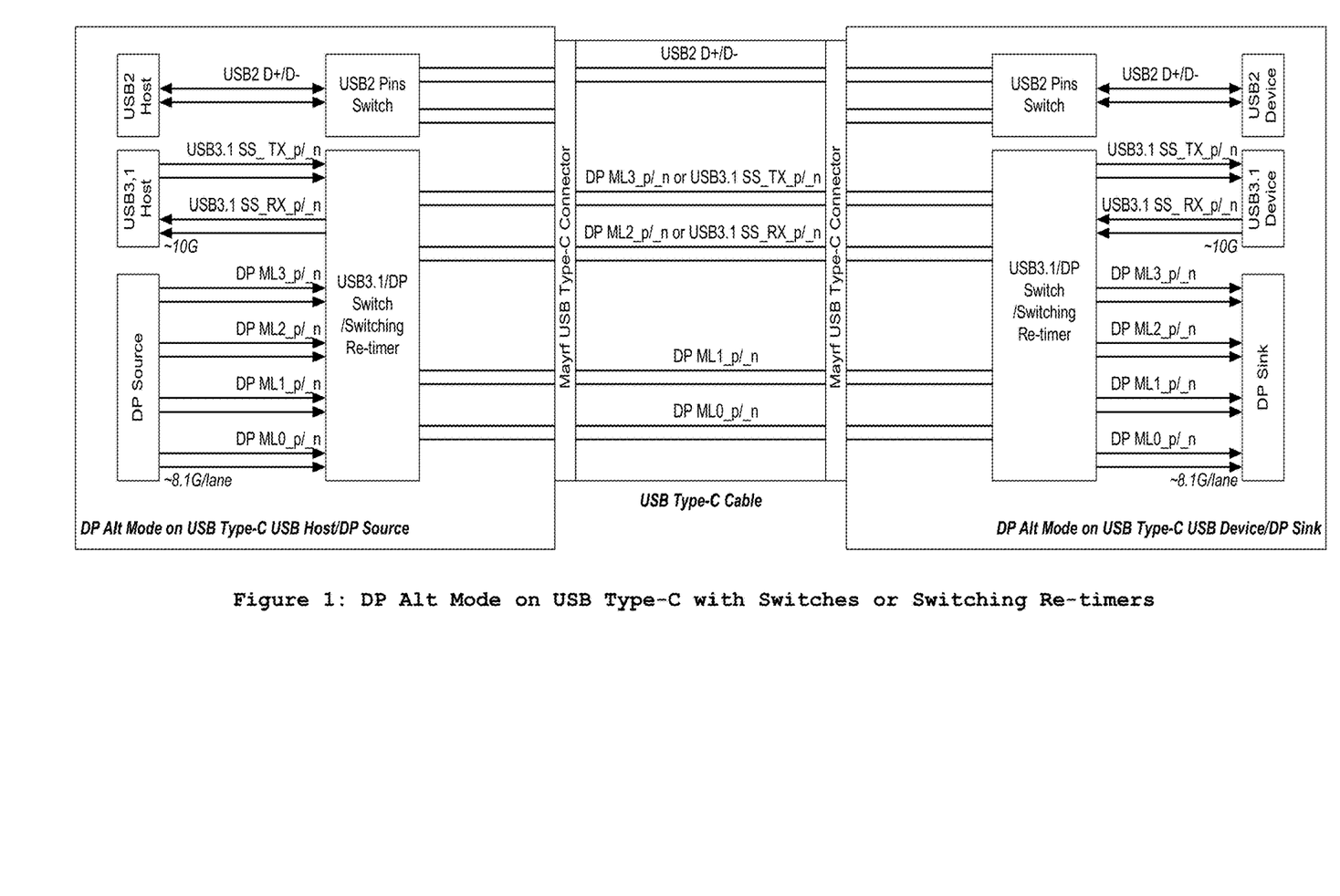
FIG. 1 illustrates DP Alt Mode on USB Type-C with Switches or Switching Re-timers.

USB Type-C devices include switches to support a plug connector orientation flip-ability feature. The switches for DP Alt Mode on USB Type-C devices also have the ability to select either USB3.x SS signals or DP signals for Main Link Lane 2 and Lane 3 as shown in FIG. 1. In order to avoid high-speed signal quality degradation over the switch, it is becoming common for the switch to have PHY signal re-timer capability ("switching re-timer").

As depicted in FIG. 7, there are only four pairs of high-speed differential signal pins on a USB Type-C connector, DP Alt Mode on USB Type-C USB Host/DP Source is only able to support either (1) DP transport over 2 lanes of DP Main Link plus USB3.x SS transport or (2) DP transport over 4 lanes of DP Main Link without USB3.x SS transport.

Figure 2:
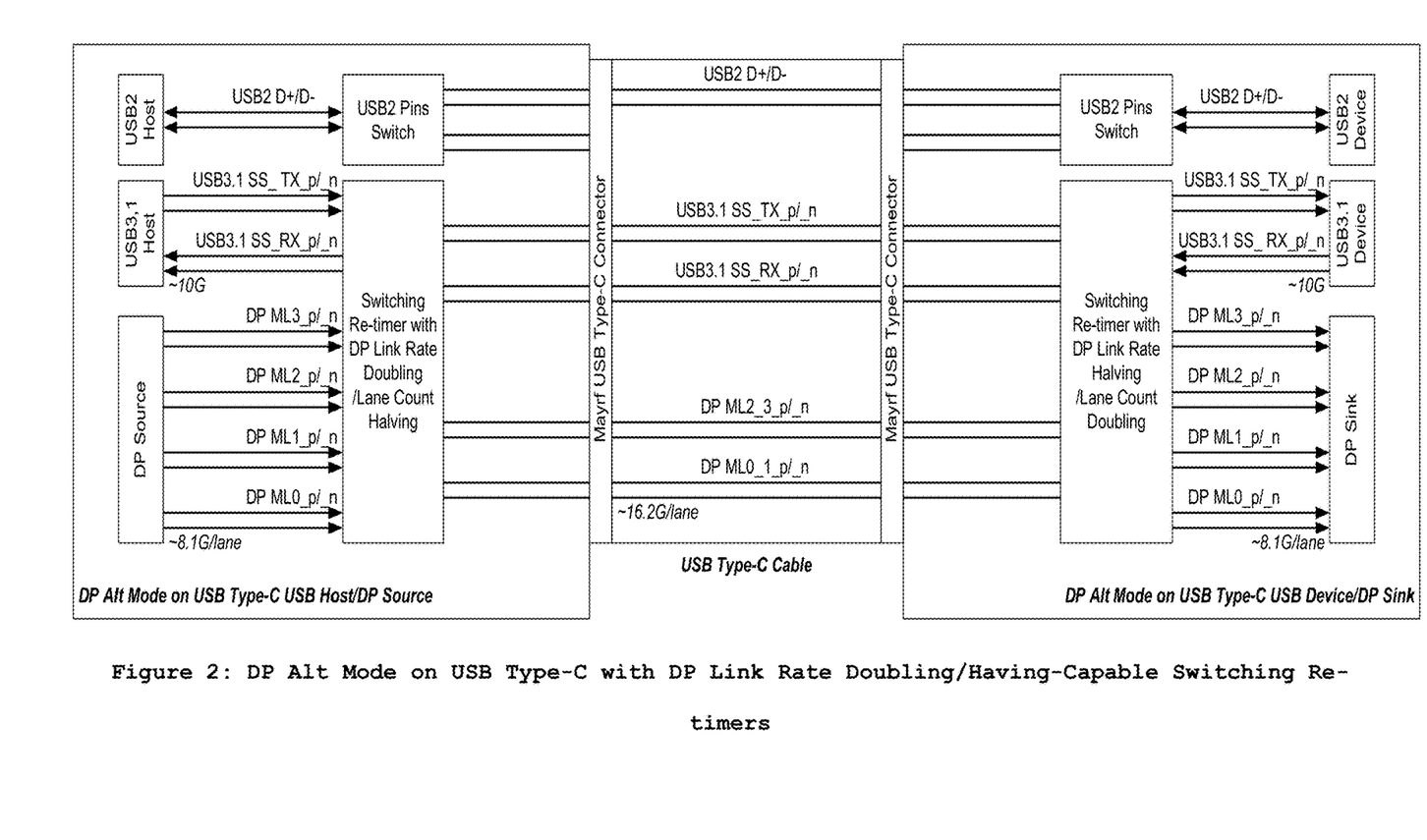
FIG. 2 illustrates DP Alt Mode on USB Type-C with DP Link Rate Doubling/Having-Capable Switching Re-timers.

With the disclosure described in this document, the Switching Re-timers are substituted with the Switching Re-timer with DP Link Rate Doubling/Lane Count Halving capability ("DP Link Rate Doubling re-timer") on the USB Host/DP Source side and Switching Re-timer with DP Link Rate Halving/Lane Count Doubling capability ("DP Link Rate Halving re-timer") on the USB Device/DP Sink side as shown FIG. 2. DP Main Link data for Lane 0 and Lane 1 are multiplexed on one differential pair while DP Main Link data for Lane 2 and Lane 3 are multiplexed on the other differential pair reserved for DP main link transport in Type C Alt Mode, thus leaving the other two pairs available for USB3.x SS traffic only.

DP Link Rate Doubling/Halving Operations

Figure 3:
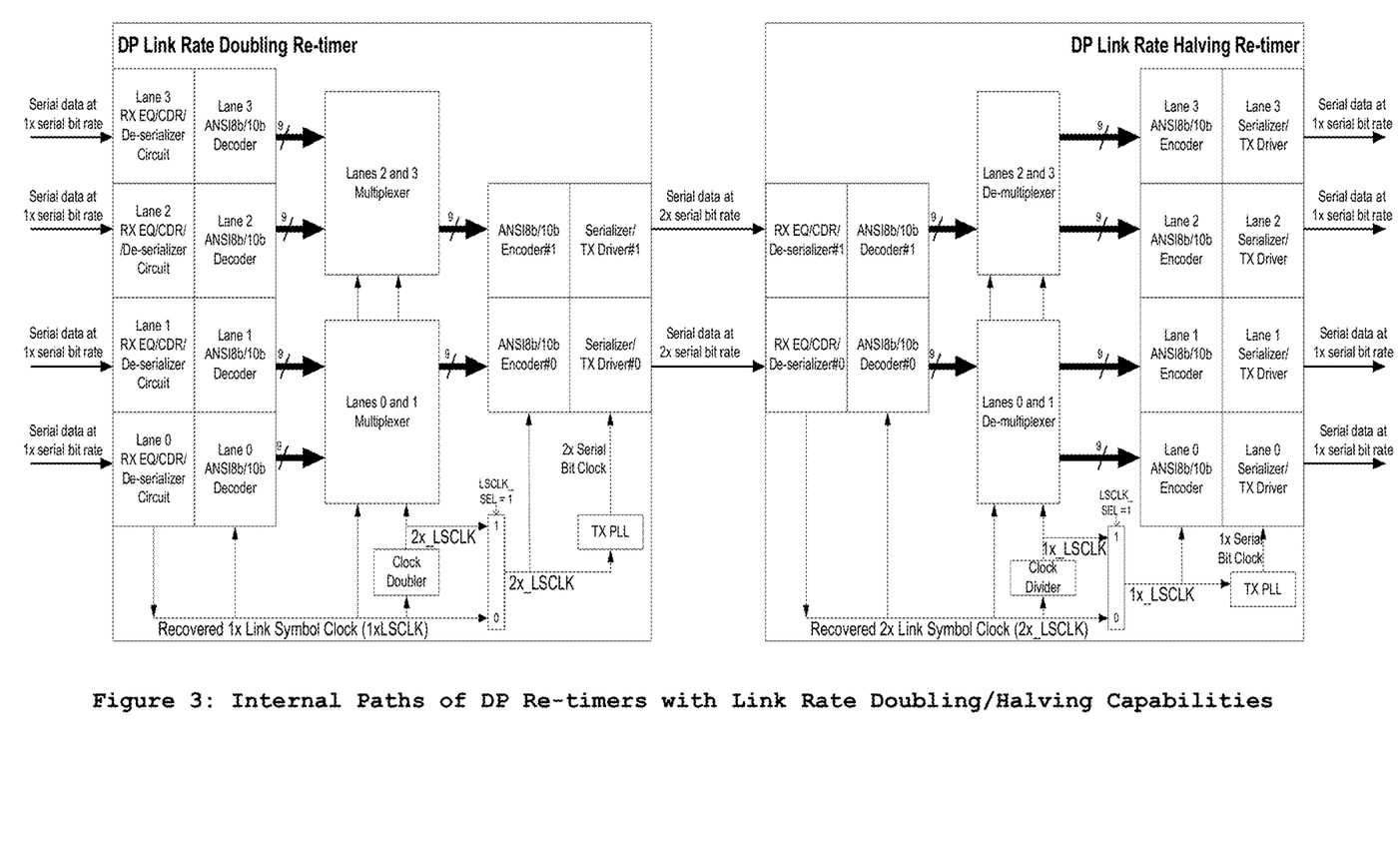
FIG. 3 illustrates Internal Paths of DP Re-timers with Link Rate Doubling/Halving Capabilities.

Internal paths of DP Link Rate Doubling re-timer and DP Link Rate Halving re-timer are shown in FIG. 3.

The DP Link Rate Doubling re-timer recovers the link symbol clock (1×_LSCLK) from a RX CDR (Clock to Data Recovery) circuit. The clock doubling circuit generates 2×_LSCLK that is used by 2-lanes-to-1-lane multiplexing circuit that multiplexes 9-bit link symbols from Lane 0 and Lane 1 (or Lane 2 and Lane 3). The 2×_LSCLK is also used both by ANSI8b/10b encoders and by TX PLL that generates 2× serial bit clock for the serializer circuit.

The DP Link Rate Halving re-timer recovers the 2× link symbol clock (2×_LSCLK) from RX CDR circuit. This recovered clock (2×_LSCLK clock) is used to decode the doubled ANSI8b/10b incoming stream and initiate the 1-lane-to-2-lanes de-multiplexing function. Following this, the 1×_LSCLK generated by the clock divider circuit, is used by 1-lane-to-2-lanes de-multiplexing circuit to de-multiplexe the 9-bit link symbols to Lane 0 and Lane 1 (or Lane 2 and Lane 3). This 1×_LSCLK is also used both by ANSI8b/10b encoders and by the TX PLL that generates 1× serial bit clock for the serializer circuit to regenerate a standard DP bit stream.

The DP Standard protocol mandates the periodic transmission of ANSI8b/10b K28.5 character (known as comma character) in the same link symbol clock cycles across all the lanes.

Figure 4:
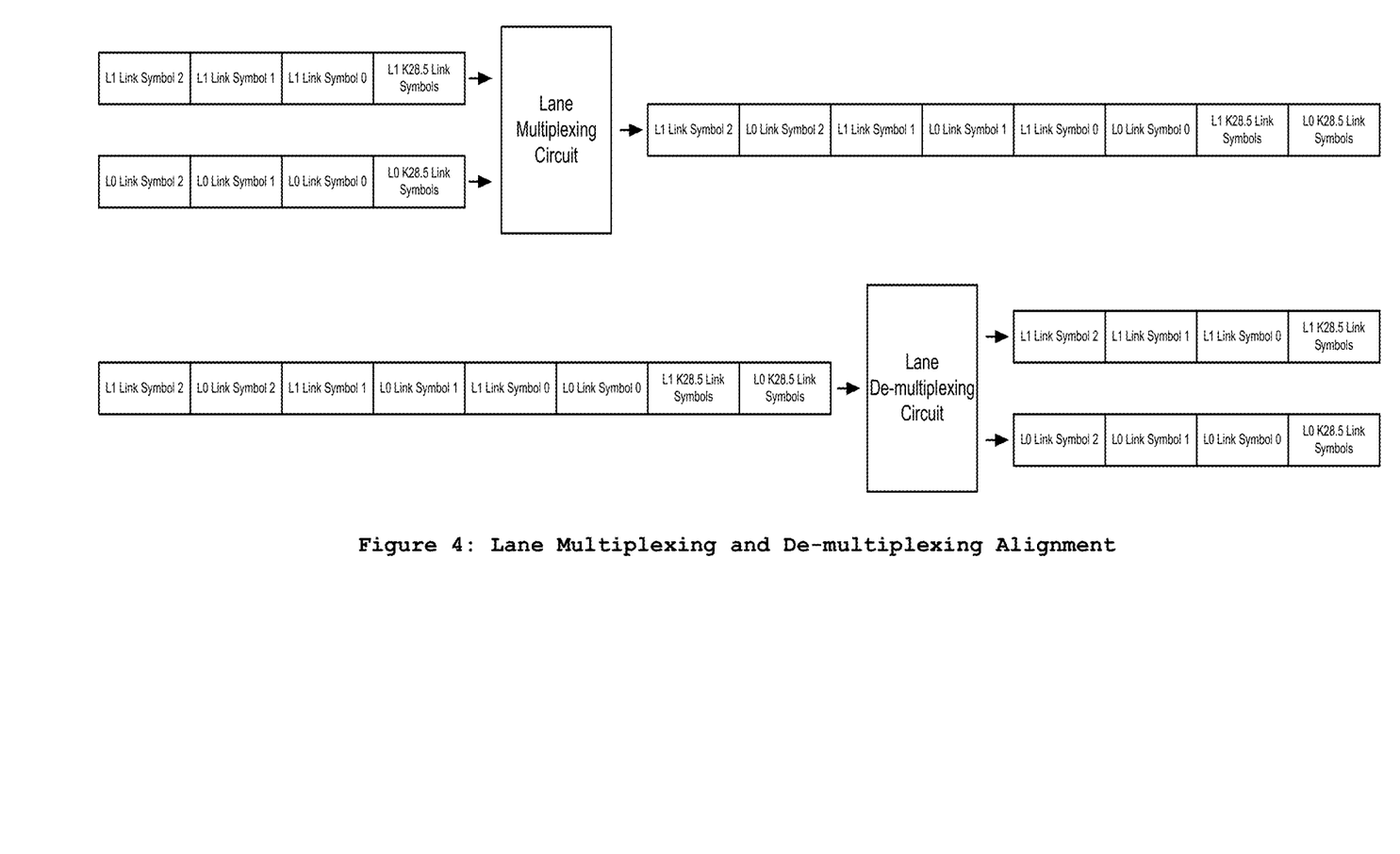
FIG. 4 illustrates Lane Multiplexing and De-multiplexing Alignment

Both the multiplexing circuit and the de-multiplexing circuit in the above re-timers use link symbol corresponding to ANSI8b/10b K28.5 ("K28.5 link symbol") as a marker for multiplexing from/de-multiplexing to proper lanes as described below and shown in FIG. 4.

When the multiplexing circuit in the DP Link Rate Doubling re-timer receives the K28.5 link symbol from both Lane 0 and Lane 1 ANSI8b/10b Decoders in the same 1×_LSCLK cycle, it pushes K28.5 link symbol to ANSI8b/10b Encoder #0 ahead of K28.5 link symbol from Lane 1

Figure 5:
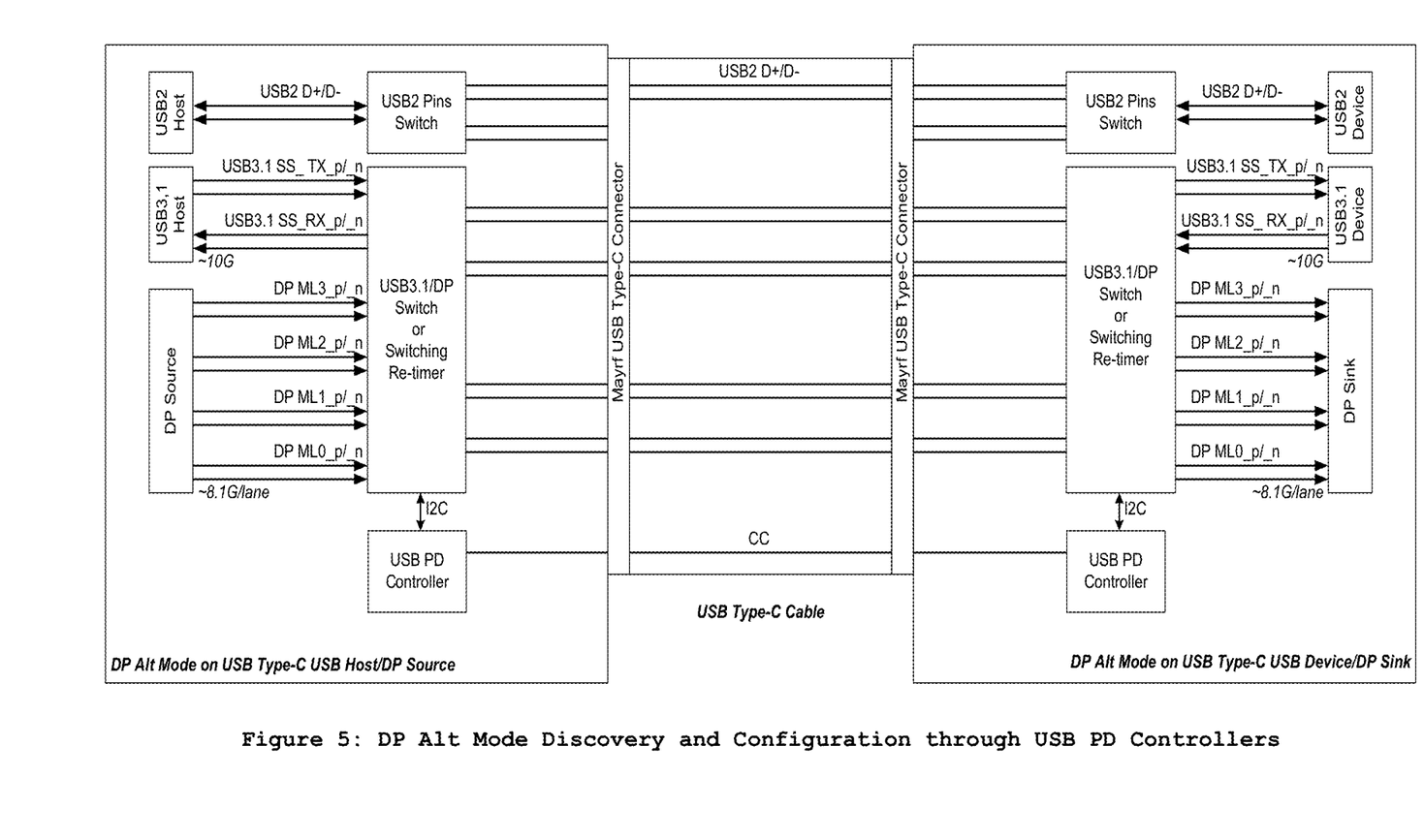
FIG. 5 illustrates DP Alt Mode Discovery and Configuration through USB PD Controllers.

When the de-multiplexing circuit in the DP Link Rate Halving re-timer receives two consecutive K28.5 link symbols, it pushes the first K28.5 link symbol to Lane 0 ANSI8b/10b Encoder and the second K28.5 link symbol to Lane 1 ANSI8b/10b Encoder DP Link Rate Doubling/Halving Re-Timers Discovery As per the DP Alt Mode on USB Type-C specification, a switching re-timer has a companion USB PD controller that manages the DP Alt Mode capability discovery and configuration through USB PD communication over CC line on a USB Type-C connector pin. A USB PD controller controls the companion switching re-timer through an embedded communication channel such as I2C that is not exposed to USB Type-C connector pins as shown in FIG. 5.

The DP Link Rate Doubling/Halving re-timers discover each other through their companion USB PD controllers using USB PD VDM (Vendor Defined Message).

Link Establishment Between DP Link Rate Doubling/Halving Re-Timers

The DP Link Rate Doubling/Halving re-timers declare themselves as LTTPR (Link Training Tunable PHY Repeater) as defined in DisplayPort Standard Ver.1.4. They both declare the support of up to 4 Main Link lanes at up to HBR3 link rate (that is, up to 8.1 Gbps/lane).

When the DP Source initiates DP Link Training over 4 lanes of Main Link, DP Link Rate Doubling re-timer on the DP Source side indicates the training at the 2× serial bit rate over 2 lanes to the DP Link Rate Halving re-timer on the DP Sink side by setting Bit 4 of TRAINING PATTERN SET DPCD register (a debug mode enable bit that does not get set during a normal operation) in the AUX write transaction to that DPCD register at the beginning of DP Link Training.

As the DP Link Rate Halving re-timer on the DP Sink side converts it back to 1× serial bit rate over 4 Main Link lanes, the conversion to 2× serial bit rate over 2 lanes between the DP Link Rate Doubling re-timer and the DP Link Rate halving re-timer is transparent to both DP Source and DP Sink.

Figure 6:
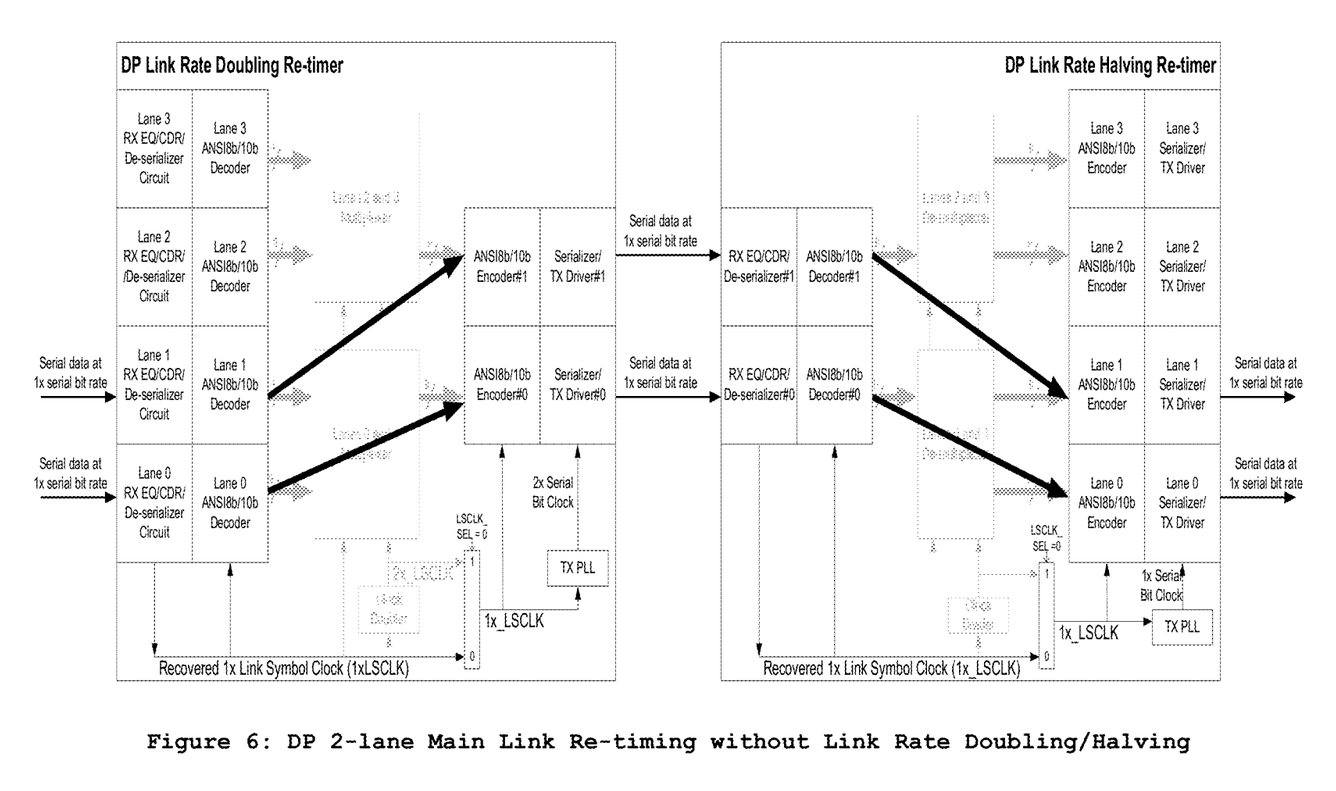
FIG. 6 illustrates DP 2-lane Main Link Re-timing without Link Rate Doubling/Halving.

In case the DP Source initiates DP Link Training over either 2 lanes (Lanes 0 and 1) or 1 lane (Lane 0) of the Main Link, the DP Link Rate Doubling re-timer clears Bit 4 of TRAINING PATTERN SET DPCD register to 0 via the AUX write transaction to that DPCD register at the beginning of DP Link Training. With Bit 4 cleared to 0, the DP Link Rate Doubling re-timer disables the DP link rate doubling/lane count halving operation and the DP Link Rate Halving re-timer disables DP link rate halving/lane count doubling operation as shown in FIG. 6.

The present invention has been described in connection with the above description, it is not intended to limit the scope of the invention to the particular form set forth, but on the contrary, it is intended to cover such alternatives, modifications, and equivalents as may be included within the spirit and scope of the inventions as defined by the appended claims.

The invention claimed is:

1. A universal serial bus (USB) transmission device, comprising:
    a first interface configured to receive display port (DP) data via M lanes at a first link rate, wherein M is an integer greater than 1; and
    a switching re-timer including
        a plurality of de-serializer circuits configured to de-serialize the received DP data,
        a plurality of decoder circuits configured to decode the de-serialized DP data,
        a plurality of multiplexer circuits configured to multiplex the de-serialized DP data received via each of the M lanes into N lanes, wherein N is an integer value equal to M/2,
        a plurality of encoder circuits configured to encode the multiplexed DP data, and
        a plurality of serializer circuits configured to serialize the encoded multiplexed DP data and output the serialized multiplexed DP data on each of the N lanes at a second link rate, wherein the second link rate is equal to the first link rate multiplied by M/N.

2. The USB transmission device of claim 1, wherein the USB transmission device is USB Type-C compliant transmission device.

3. The USB transmission device of claim 2, wherein the USB transmission device is configured to operate in DP Alt Mode.

4. The USB transmission device of claim 1, wherein the switching re-timer is configured to:
    receive USB super speed (SS) data via Y lanes at a third link rate; and
    output the USB SS data via Z lanes at the third link rate, wherein Y is equal to Z.

5. The USB transmission device of claim 4, wherein the N lanes via which the DP data is output and the Z lanes via which the USB SS data is output are output to main link lines of a USB Type-C connector.

6. The USB transmission device of claim 1, wherein the USB transmission device is a USB Type-C connector.

7. The USB transmission device of claim 6, further comprising:
    four pairs of high-speed differential signal pins.

8. The USB transmission device of claim 7, wherein N equals 2, and
    the switching re-timer is configured to output the multiplexed data on each of the N lanes via 2 pairs of the high-speed differential signal pins.

9. The USB transmission device of claim 8, wherein the switching re-timer is configured to:

receive USB super speed (SS) data via 2 lanes at a third link rate;
output the USB SS data via 2 lanes at the third link rate over another two pairs of the high-speed differential signal pins.

10. The USB transmission device of claim 1, wherein
M equals 4, and
N equals 2.

11. The USB transmission device of claim 10, wherein the switching re-timer is configured to recover a link symbol clock from a clock-to-data recovery circuit.

12. The USB transmission device of claim 11, wherein the switching re-timer is configured to double a speed of the link symbol clock to output the multiplexed data on each of the N lanes at the second link rate.

13. A universal serial bus (USB) reception device, comprising:
a first interface configured to receive display port (DP) data via M lanes at a first link rate, wherein M is an integer greater than 1;
a switching re-timer including
a plurality of de-serializer circuits configured to de-serialize the received DP data,
a plurality of decoder circuits configured to decode the de-serialized DP data,
a plurality of de-multiplexer circuits configured to demultiplex the de-serialized DP data received via each of the M lanes into N lanes, wherein N is an integer value equal to M multiplied by 2,
a plurality of encoder circuits configured to encode the demultiplexed DP data, and
a plurality of serializer circuits configured to serialize the encoded demultiplexed DP data and output the serialized demultiplexed DP data on each of the N lanes at a second link rate, wherein the second link rate is equal to the first link rate multiplied by M/N.

14. The USB reception device of claim 13, wherein the USB reception device is USB Type-C compliant reception device.

15. The USB reception device of claim 14, wherein the USB reception device is configured to operate in DP Alt Mode.

16. The USB reception device of claim 13, wherein the switching re-timer is configured to:
receive USB super speed (SS) data via Y lanes at a third link rate; and
output the USB SS data via Z lanes at the third link rate, wherein Y is equal to Z.

17. The USB reception device of claim 16, wherein the M lanes via which the DP data is received and the Y lanes via which the USB SS data is received correspond to main link lines of a USB Type-C connector.

18. The USB reception device of claim 13, wherein the USB reception device is a USB Type-C connector.

19. The USB reception device of claim 18, further comprising:
four pairs of high-speed differential signal pins.

20. The USB reception device of claim 19, wherein
M equals 2, and
the switching re-timer is configured to receive the DP data on each of the M lanes via 2 pairs of the high-speed differential signal pins.

21. The USB reception device of claim 20, wherein the switching re-timer is configured to:
receive USB super speed (SS) data over another two pairs of the high-speed differential signal pins.

22. The USB reception device of claim 13, wherein
M equals 2, and
N equals 4.

23. The USB reception device of claim 22, wherein the switching re-timer is configured to recover a link symbol clock from a clock-to-data recovery circuit.

24. The USB reception device of claim 23, wherein the switching re-timer is configured to reduce a speed of the link symbol clock in half to output the demultiplexed data on each of the N lanes at the second link rate.

25. A data transmission system comprising:
a universal serial bus (USB) transmission device, comprising:
a first interface configured to receive display port (DP) data via M lanes at a first link rate, wherein M is an integer greater than 1;
a first switching re-timer including
a plurality of first de-serializer circuits configured to de-serialize the received DP data,
a plurality of first decoder circuits configured to decode the de-serialized DP data,
a plurality of multiplexer circuits configured to multiplex the de-serialized DP data received via each of the M lanes into N lanes, wherein N is an integer value equal to M/2,
a plurality of first encoder circuits configured to encode the multiplexed DP data, and
a plurality of first serializer circuits configured to serialize the encoded multiplexed DP data and output the serialized multiplexed DP data on each of the N lanes at a second link rate, wherein the second link rate is equal to the first link rate multiplied by M/N; and
a USB reception device, comprising:
a second interface configured to receive the DP data output from the USB transmission device on Y lanes at the second link rate, wherein Y is an integer greater than 1;
a second switching re-timer including
a plurality of second de-serializer circuits configured to de-serialize the received DP data,
a plurality of second decoder circuits configured to decode the de-serialized DP data,
a plurality of de-multiplexer circuits configured to demultiplex the de-serialized DP data received via each of the Y lanes into Z lanes, wherein Z is an integer value equal to Y multiplied by 2,
a plurality of second encoder circuits configured to encode the demultiplexed DP data, and
a plurality of second serializer circuits configured to serialize the encoded demultiplexed DP data and output the serialized demultiplexed DP data on each of the Z lanes at the first link rate.

* * * * *